UNITED STATES PATENT OFFICE.

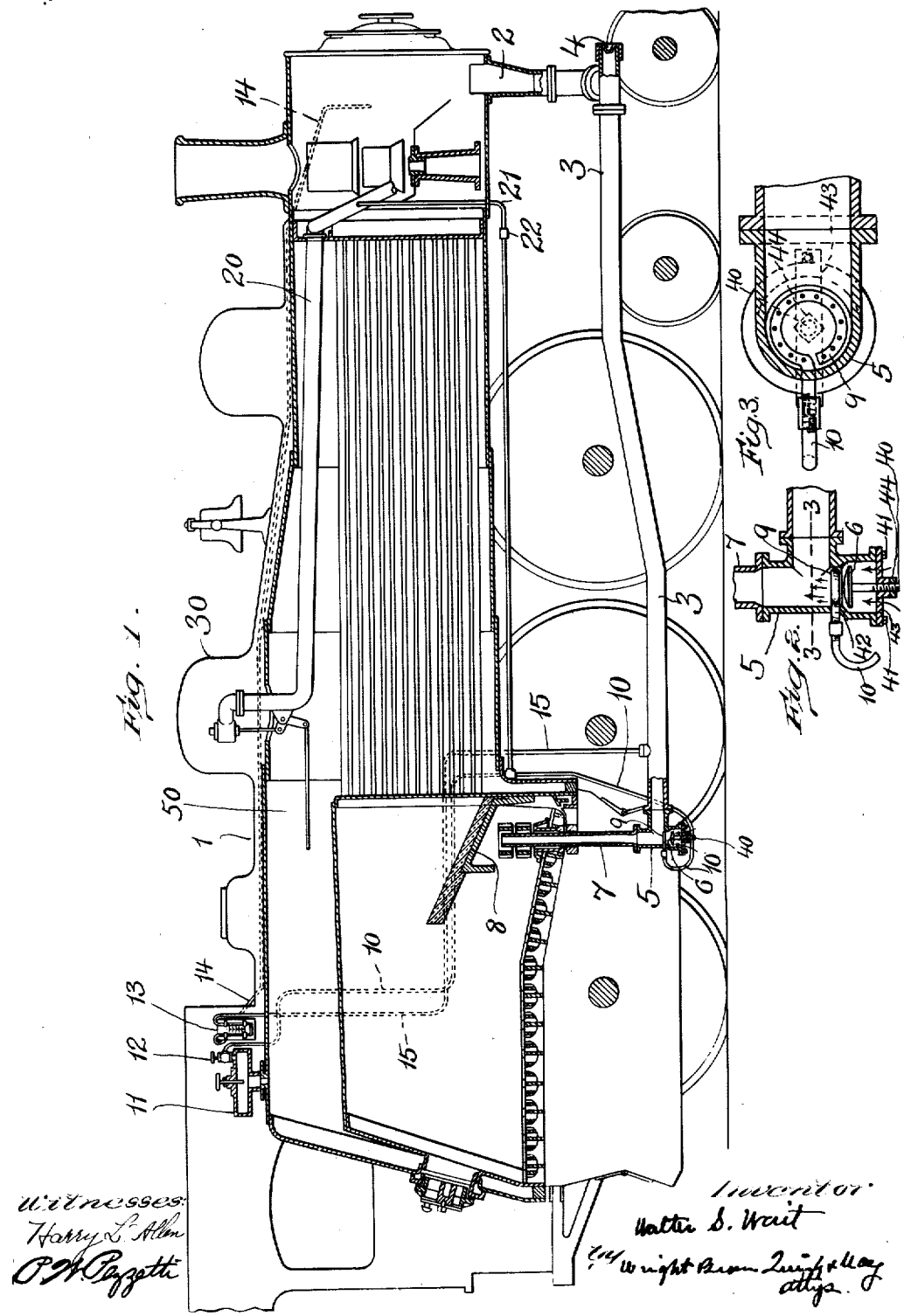

WALTER SEAVERNS WAIT, OF NEWTON, MASSACHUSETTS.

SMOKE-CONSUMER FOR LOCOMOTIVES.

1,012,484.     Specification of Letters Patent.     Patented Dec. 19, 1911.

Continuation of application Serial No. 576,716, filed August 11, 1910. This application filed February 24, 1911. Serial No. 610,589.

*To all whom it may concern:*

Be it known that I, WALTER SEAVERNS WAIT, of Newton, in the county of Middlesex and State of Massachusetts, have invented certain new and useful Improvements in Smoke-Consumers for Locomotives, of which the following is a specification.

This invention relates to an improvement in smoke consumers for locomotives and other boilers and consists in the provision of means for insuring the application of the steam pressure of the engine to a smoke consumer at the time the engine is started, irrespective of the volition of the engineer.

Reference is to be had to the accompanying sheet of drawings forming a part of this application, in which like characters indicate like parts wherever they occur.

In the drawings,—Figure 1 is a side elevation and shows a conventional form of locomotive equipped with my improved apparatus. Fig. 2 is an enlarged detail sectional view of the union and the adjustable valve controlling one of the air ports, and the steam injector carried by said union. Fig. 3 is a cross-sectional view on the line 3—3 of Fig. 2, showing the apertures in the circular pipe forming the steam injector, through which apertures the steam is forced to create a suction.

The drawing in Fig. 1, shows in side elevation, a locomotive equipped with a smoke-consuming apparatus of the general form shown in United States Letters Patent to Schleyder, No. 843,848, dated February 12, 1907, to which is applied my improvement.

While I have illustrated my invention in connection with the apparatus of the Schleyder patent referred to, I do not wish to be understood as limiting my invention to said apparatus, as I have designed it for use in connection with any smoke-consuming apparatus where such an apparatus or appliance is desired.

The locomotive 1, is shown in a vertical sectional view, and may be of any preferred construction. The Schleyder smoke-consuming apparatus comprising the pipe 2 leading from the smoke-box, the pipe 3 leading from the pipe 2, the air inlet or port 4, the union 5, the pipe 7 leading from the union 5 into the fire-box, the baffle-plate 8, the injector 9, the pipe 10 leading from the injector 9 to the boiler or steam chamber 50, or some boiler or steam chamber connection as 11, the cock 12, the differential gage 13, the pipe 14 extending from said gage to the smoke-box, the pipe 15 extending from said gage to the pipe 3 near the union 5, as shown, are of the general construction and arrangement shown and described in the said Schleyder patent, and need no further description. While the valve for the air port in the union 5 may be as shown in said Schleyder patent, I prefer the form of valve 6 shown in my drawings, carried by a screw-threaded stem 40, and adapted to engage a concave seat 42 at the base of the union 5.

43 represents a bar carried by the union 5, adapted to hold and guide the stem 40. 44, is a nut arranged on said stem, provided with a screw-threaded perforation, by which the vertical height of the valve 6 may be adjusted to either close the port altogether, or adjust the opening between the valve 6 and the seat 42 to regulate the amount of air to be drawn in.

The bar 43 is shown as connected to the lower end of the union 5, by lag screws 41, 41. This bar does not cover the whole opening and is only wide enough to afford suitable support for the stem 40, leaving a passage way on each side of said bar for air. The course of the air currents by the bar 43, by the valve 6, is indicated by arrows. The course of the steam of the injector pipe 9 is also indicated by arrows.

As shown in Fig. 2, the seat 42 is just below the injector pipe 9, and the top surface of the latter is just below the bottom surface of the pipe 3. Such location of the steam injector permits the creation of the necessary draft, without interfering with the bore or action of the pipe 3.

In the use of the apparatus so far described, the engineer by opening the cock 12, permits the steam to pass into the injector 9, then upward through the pipe 7, thereby creating suction in the union 5, drawing in the air through the valve 6, drawing in the air through the pipe 3, the air inlet or port 4, and the products of combustion from the smoke-box to the pipe 2, thus drawing the cinders and other products of combustion from the smoke-box and mixing the same with the steam and air and forcing them against the baffle-plate 8 in the fire-box. The amount of air received through the air inlet or port or seat 42 can be regulated as desired by adjusting the valve stem 40.

This form of apparatus gives entirely satisfactory results, provided the engineer is not careless or malicious in failing to open the cock 12, or properly regulate the same. If said cock be not opened, or the opening not properly regulated by the engineer, then the cinders when the engine is started collect in and clog the pipe connections, 2, 3, etc., thus preventing the operation of the apparatus. By my invention this difficulty to which I have referred is overcome, means being provided to supply the necessary steam to the injector 9 upon the starting of the engine, even though the engineer fails to open or properly regulate the cock 12. It will be understood that for the correct working of such device or apparatus, it is necessary that the suction in the pipe 2 exceed that out of the stack. Therefore, although the cock 12 might be properly adjusted for operation while the engine was standing still, yet, as the speed of the piston was increased, the forced draft out of the smoke-stack is correspondingly increased, and the engineer should open the valve 12 to adjust the flow of steam therethrough to correspond to the increased speed of the piston, or the increased draft out of the stack. If this is not done by the engineer, then there is danger of the pipes 2, 3, etc., becoming clogged, as happens when the valve 2 is not open at all, though, possibly not to the same extent. In either case, however, where the cock is not open, or not properly adjusted to the speed of the piston, the apparatus fails to work properly and the smoke, cinders and other products of combustion are not satisfactorily treated or consumed.

20 represents a dry pipe leading from the steam drum or steam chamber connection 30 to the cylinders. This is an ordinary and well known construction and requires no further description.

In operation, when the engineer desires to start the engine he opens the throttle, which admits steam from the steam drum to the dry pipe 20, and thus to the cylinders.

21 represents a pipe, the end of which is tapped into the pipe 20, or one of its branches, at any convenient point. The other end of the pipe 21 is tapped into the pipe 10, as shown.

22 represents a valve of any well known or preferred type, interposed in the pipe 21 between its ends, in order to regulate the pressure and amount of steam that can pass through said valve to the pipe 10.

Schleyder's apparatus being constructed and arranged as described, and my improved apparatus being applied as described, then, even though the engineer neglects or fails to open the cock 12, or fails to open it sufficiently, then upon the opening of the throttle to start the engine, the required amount of steam passes from the pipe 20 into the pipe 21, through the valve 22 into the pipe 10, into and through the injector 9, up through the pipe 7, as before.

By my invention the failure of the apparatus to work, due to the carelessness or inattention of the engineer, is overcome. A further advantage secured by my improvement is that the engineer is not required to manipulate or regulate the valve 12 to increase or decrease the pressure of the steam out of the injector 9, to correspond with the increased pressure of the exhaust, due to increased speed, or vice versa, since, when my apparatus is applied, the necessary increase or decrease of the pressure at the injector 9, is automatically taken care of by the increase of pressure through the pipe 21, or vice versa. When the engine is at rest there is no danger of the clogging of the connection pipes by cinders, whether my apparatus is used or not. In the latter case the passage of steam through the injector 9 can be regulated as desired, or interrupted entirely by means of the cock 12. It will be further noted that in my apparatus, when the correct ratio of steam passing through the reduction valve 22 is once determined, then the necessary increase or decrease of steam at injector 9, due to the increased or decreased speed of the piston, is automatically controlled, these variations follow simultaneously the changes in speed of the piston, due to the manipulation of the throttle valve by the engineer. The valve 22 is not necessary, if the pipe 21 is properly proportioned as to size or capacity.

While I have shown my invention applied to a locomotive, so called, I do not wish to be understood as limiting my invention to that form of a combustion apparatus, it being manifestly immaterial, so far as my improvement is concerned, whether the steam passing through the pipe 20 is employed for driving a locomotive or a stationary engine, or is employed for any other purpose, since my invention contemplates the utilizing of the passage of the steam through said pipe irrespective of what is done with the steam at the delivery end of said pipe. Further, the terms "fire-box" and "smoke-box" are to be understood as being used by me broadly and not being restricted to any particular construction or position, the term "smoke-box" in particular, embracing any chamber or passage-way for the products of combustion after they leave the fire-box or combustion chamber.

Having thus explained the nature of my invention and described a way of constructing and using the same, though without attempting to set forth all of the forms in which it may be made, or all of the modes of its use, what I claim and desire to secure by Letters Patent is:—

A combustion apparatus comprising a fire box, a smoke box, a pipe leading from the smoke box to the fire box and arranged to receive cinders and other products of combustion entering into the smoke box and deliver them into the fire box, an injector arranged in said pipe, a steam chamber, connections between said steam chamber and said injector whereby the passage of steam out of said injector creates and maintains a draft through said pipe from said smoke box into said fire box, an air inlet arranged in said pipe, a delivery pipe connected to said steam chamber, and a pipe leading from said delivery pipe and adapted to supply steam to said injector to automatically maintain the action of said injector with relation to the passage of steam through said delivery pipe.

In testimony whereof I have affixed my signature, in presence of two witnesses.

WALTER SEAVERNS WAIT.

Witnesses:
WILLIAM QUINBY,
P. W. PEZZETTI.